Feb. 24, 1970　　　　W. C. HARMON　　　　3,497,799
COIL APPARATUS AND METHOD FOR INDUCING EDDY CURRENTS
IN A METALLIC OBJECT AND DETECTING FLAWS IN
RESPONSE TO A CHANGE IN IMPEDANCE LOAD
Filed June 10, 1965　　　　　　　　　　　　　2 Sheets-Sheet 1
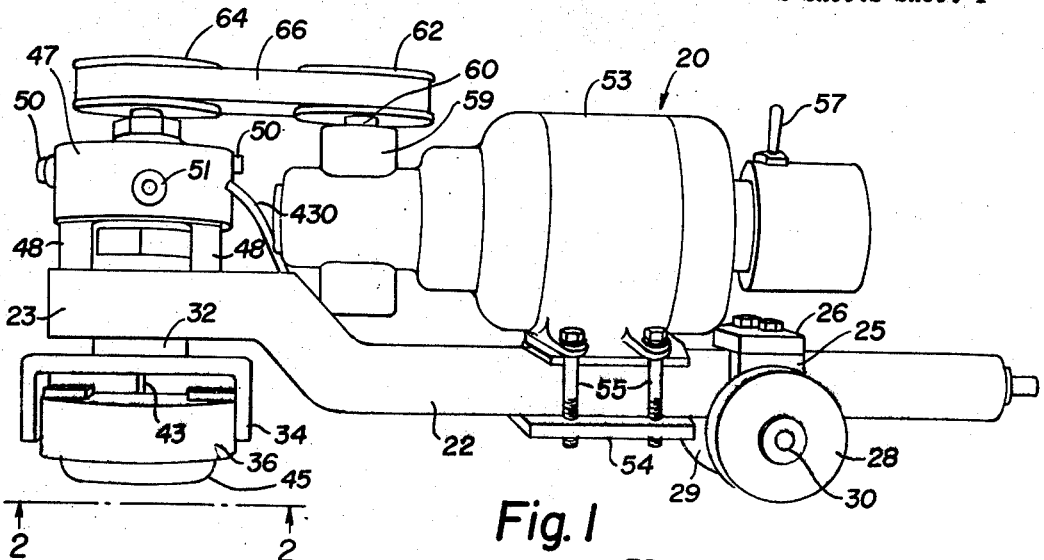
INVENTOR.
WILLIAM C. HARMON
BY
*Watts & Fisher*
ATTORNEYS ns Patent Office 3,497,799
Patented Feb. 24, 1970

3,497,799
COIL APPARATUS AND METHOD FOR INDUCING EDDY CURRENTS IN A METALLIC OBJECT AND DETECTING FLAWS IN RESPONSE TO A CHANGE IN IMPEDANCE LOAD
William C. Harmon, Chagrin Falls, Ohio, assignor to Republic Steel Corporation, Cleveland, Ohio, a corporation of New Jersey
Filed June 10, 1965, Ser. No. 462,907
Int. Cl. G01r 33/12
U.S. Cl. 324—37
8 Claims

ABSTRACT OF THE DISCLOSURE

Search coils of generally coplanar windings in series opposition with each other and in series with an energizing circuit induce eddy currents in a metallic object being inspected. The coils constitute an impedance load for the energizer and for an eddy current circuit of which the coils form a part. Changes in coil impedance due to flaws in the object being inspected vary the current frequency in the energizing circuit and this change signals the presence of a defect.

---

This invention relates to the inspection of metallic objects, particularly for detecting and evaluating surface or near surface defects, such as seams, cracks, laps, slivers, or like flaws in metal test pieces.

Methods and apparatus for detecting the presence of flaws or imperfections of the type referred to above by measurements conducted at the surface of a metal test piece, such as a steel billet or pipe coupling, are disclosed in U.S. Patents Nos. 2,660,704; 2,832,040; 2,914,726; and 2,979,196 all issued to William C. Harmon. In the apparatus disclosed in the above patents, a high frequency oscillator is utilized to energize a search coil for generating an electromagnetic field in the vicinity of a search coil. When the search coil is placed adjacent a billet or other metallic object to be tested, the reaction produced upon the search coil by the interaction of the test object with the electromagnetic field modifies the operation of the high frequency oscillator in accordance with the flaw in the metal of the test piece. The effect of the metal object being tested upon the performance of the oscillator as the search coil is moved over the surface of the object thus provides a measure of the presence or absence of flaws in the test object.

In the past, inspection in the manner described above has been accomplished with a probe utilizing a single detector coil. It has now been discovered that, for many applications, significant advantages can be obtained by utilizing two coils connected in series opposition and of improved construction, arranged to simultaneously detect spaced sections of a single flaw and to maximize the electrical coupling between the test object and the coils.

By way of background, it is often necessary to operate a seam depth indicator in an area where there is severe electrical interference. The interference may come from an electric welder, or other heavy electric machinery, and may be in the form of strong alternating current fields, strong electrical transients, or both. The accuracy of a single detector coil is upset if it is operated where it can pick up interfering alternating current electrical fields, and it produces erroneous defect indications when in the presence of electrical transients.

In accordance with the present invention, the above difficulties are overcome and further advantages are obtained by dividing the detector coil into two equal windings. The two windings are placed side-by-side, with the center axis of each winding perpendicular to the test piece. The two windings are connected in series opposed and utilized with a high-frequency oscillator and a detector circuit. The circuit includes a feed back loop to stabilize the oscillator so that it does not respond to variations of the coupling in the search coil as may be due to convexities in the surface or variations in the texture of the surface of the test piece. With this arrangement, a voltage induced by the interfering electrical field in one winding is cancelled by the equal but opposite voltage induced by the interfering electrical field in the other winding. Although the two windings cancel electrical interference, they aid each other in detecting defects because it is the change in coil impedance that registers the defect. The change in coil impedance is independent of the relative polarity of the two windings.

By the use of two closely adjacent detector coils, an indication of a defect is obtained that is more nearly representative of the average depth of the defect. This is because almost all natural defects vary considerably in depth, even for short distances along their length and, with twin coils slightly spaced, two spaced lengths of a defect are simultaneously sampled to produce a single signal indicative of the average depth sensed by both coils.

Such an arrangement is particularly advantageous for use with automated inspection systems. For example, in a great many instances, defects are elongated in a predetermined direction, as determined by the process by which the object being tested was manufactured. Defects such as seams in steel rods extend predominantly longitudinally along the rod. The rod is rotated about its longitudinal axis and moved longitudinally relative to a scanning head, resulting in a spiral scanning path. By locating the two search coils aligned longitudinally of the rod, a wide, spiral, scanning path is obtained and the two coils simultaneously sense spaced portions of individual defects. A further example is in the scanning of flat pieces having randomly oriented and crooked flaws. A pair of rotating search coils moved in translation across the surface senses two portions of a defect as the coils are moved along the objects. In such an arrangement improved results are obtained when the coils are rotated at a speed relatively great with respect to the translational movement.

In accordance with the present invention, a novel arrangement has been provided in which a pair of search coils connected in series opposed are rotated about an axis between the two coils so that defects that are crooked or oriented in random directions may be sensed simultaneously with both coils. In this way, the advantages of twin search coils may be utilized where defects do not extend only in a predetermined direction.

It is a further feature of this invention to construct the search coils in an improved shape to enhance the electrical coupling between the coils and a test object having a round or curved surface. To this end, the detector coils themselves are shaped at their terminal ends to essentially conform with the curvature of the surface of the test object. Furthermore, improved scanning, particularly on narrow, elongated, test objects, is obtained by constructing the search coils in an oval or elliptical configuration elongated in the direction of alignment of the two coils. This provides a larger sampling of the defect for a given width of the coils. With a test object having an extreme curvature, for example, a steel rod of small diameter, it is advantageous to utilize elliptical coils contoured to the curvature of the test object. By orienting the direction of elongation of the coils along the small diameter rod, the minor axis of the oval or ellipse facilitates electrical coupling with a minimum of curvature to the terminal end of the coil; the major axis of the ellipse provides a wide spiral scanning path when the twin coils scan a steel rod that is rotated about its longitudinal axis and moved longitudinally relative to the coils.

Briefly, and by way of introduction to the detailed description, twin search coils are provided to both establish an electromagnetic field in the test item and to detect variations in the field caused by flaws in the test object. The search coils need not actually touch the test item, but should be closely spaced therefrom. The search coils are energized by an oscillating vacuum tube and generate currents in the steel or other metal being tested. When a flaw in the metal is encountered, the loading of the search coils is decreased and therefore the output of the oscillator increases. This variation in oscillator output is detected by an electrical system.

The attendant advantages and features of this invention and the various embodiments thereof will be readily appreciated as the same become better understood by reference to the following detailed description when considered in connection with the accompanying drawings in which:

FIGURE 1 is a perspective view of a scanning unit on a movable support and having a rotating search coil assembly;

FIGURE 2 is a bottom plan view of the search coil head of FIGURE 1, taken along the line 2—2 and looking in the direction of the arrows;

FIGURE 3 is a sectional view, with parts in elevation, taken along the line 3—3 of FIGURE 4, showing a mounting block and two search coils constructed in accordance with this invention;

FIGURE 4 is an end elevational view of the mounting block of FIGURE 3;

FIGURE 5 is a section view with parts in elevation, taken along the line 5—5 of FIGURE 6, showing another embodiment of a mounting block and two search coils, with the bottom or the mounting block and the terminal ends of the coils contoured to conform with a cylindrical surface;

FIGURE 6 is a diagrammatic and elevational view of the mounting block of FIGURE 5;

FIGURE 7 is an enlarged diagrammatic end elevational view of a contoured coil of the type indicated in dotted line in FIGURE 6, and illustrated the manner in which the coil is curved to conform with a cylindrical upper surface of a protective element that rides on a cylindrical test piece;

FIGURE 8 is a plan view of the coil of FIGURE 7;

FIGURE 9 is a diagrammatic, bottom plan view of two elliptical search coils constructed in accordance with the present invention;

Figure 10:
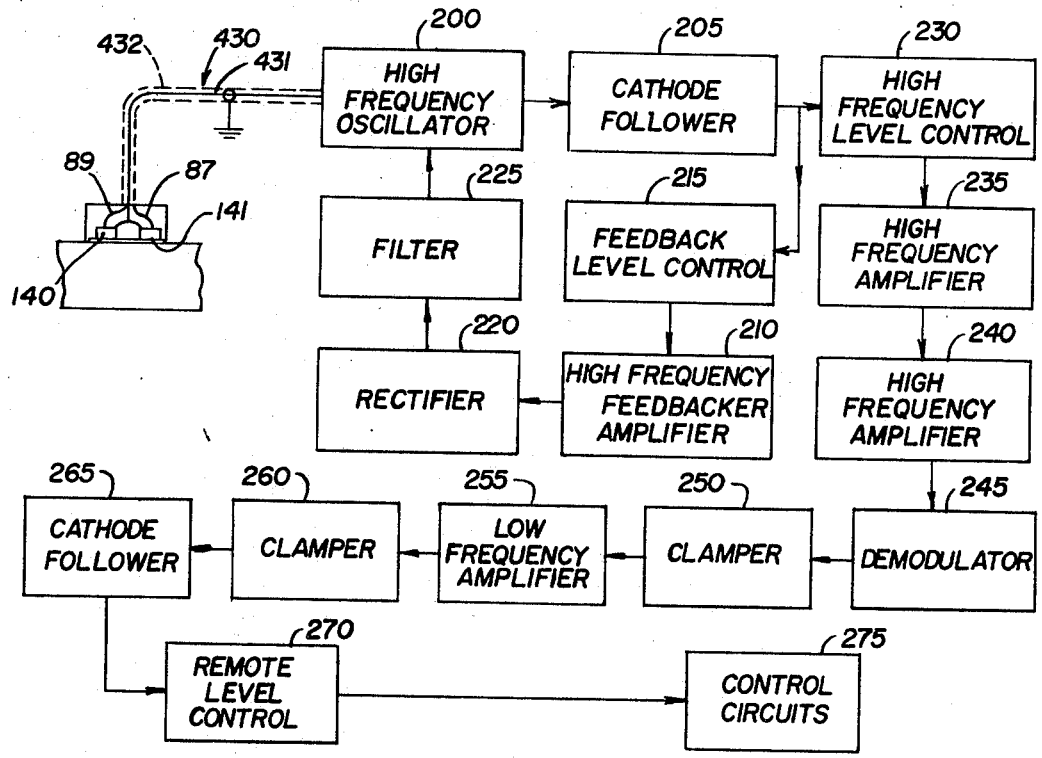
FIGURE 10 is a block and schematic diagram of the electric detector circuits associated with the detector coils of the present invention.

Referring now to FIGURE 1, there is shown a portable assembly or unit 20 for inspecting relatively large, flat metallic objects, such as steel stabs, sheets or billets. The unit is particularly adapted to be supported upon and moved relative to the object being tested and to detect flaws that may be oriented in random directions, or that may be curved or crooked. The unit is formed of a supporting frame member 22 that has an upwardly offset portion 23. A carriage assembly 25 is secured to the support frame member 22 by a mounting bracket 26 at a location spaced from the offset portion 23. The carriage assembly 25 includes two support wheels 28 and 29 spaced from each other transversely of the frame 22 and carried by an axle 30 mounted in the carriage assembly 25.

A hollow rotatable shaft 32 is mounted vertically by suitable journal means (not shown) in the offset portion 23 of the support frame member 22. The lower end of the rotatable shaft 32 extends downward from the support frame and carries a yoke 34. A circular search coil mounting bracket 36 is mounted within the yoke 34 by a pair of pivot pins 37 and 38 supported in depending ends of yoke 34. As best shown in FIGURE 2, a pair of spaced search coils 40 and 41 are mounted centrally of the search coil mounting bracket 36, spaced from each other on a line intersecting the axis of rotation of the shaft 32, yoke 34 and search coil mounting bracket 36. Each coil 40 and 41 is oriented with the coil axis parallel to the longitudinal axis of the rotatable shaft 32, and is adapted to be positioned vertically with respect to a metallic object being tested. The axis of each coil 40 and 41 is equally spaced from the axis of rotation of the shaft 32. Each search coil 40 and 41 may be independently mounted in the mounting bracket 36, or may be contained in a mounting block of the type shown generally in FIGURE 3, to be described below, and supported as a sub-assembly by the mounting bracket 36. While the coils will be described in more detail below in connection with the other embodiments, for the purpose of the present embodiment it will suffice to indicate that the coils have no iron core, are each formed of a plurality of turns of wire, and are connected together in series opposition with the center leads of each coil tied together, i.e., connected electrically, and the outer leads electrically connected to a shielded concentric cable 43, shown in FIGURE 1. A wear shoe 45 is mounted on and extends downward from the circular mounting bracket 36. The wear shoe 45 is adapted to ride upon the metallic object being tested, and spaces the search coils 40 and 41 a predetermined distance from the object. The wear shoe is constructed of a hard material, such as carbide.

The cable 43 extends upward from the mounting bracket 36 through the rotatable shaft 32. The central lead of cable 43 is connected to one of two separate and axially spaced slip rings (not shown) carried by the rotatable shaft 32. The shield is connected to the other. The slip rings are located on an upward extending portion of shaft 32 that is surrounded by a brush holder bracket 47. The brush holder bracket 47 is supported above the offset portion 23 of the frame 22 by a plurality of support rods 48. The brush holder bracket 47 has two axially spaced rows of peripherally spaced brush holders 50 and 51, each row axially aligned with one of the slip rings. Brushes associated with brush holders 50 cooperate with one of the two slip rings of the rotatable shaft 32 to provide an electrical connection with one of the leads of cable 43. The other brush holders 51 have associated brushes that cooperate with the other of the two slip rings on the rotatable shaft 32 to provide an electrical connection with the other load of cable 43. A similar cable 430 is connected to the brushes of brush holders 50 and 51, and functions as a fixed extension of cable 43, which rotates with the scanning unit. The shield of cable 430 is grounded and the central lead is connected to a high frequency oscillator to energize the coils 40 and 41, as will be explained in more detail below.

An electric motor 53 is supported on the frame member 22 by a mounting bracket 54 and bolts 55. An on-off control switch 57 is provided adjacent one end of the drive motor 53. The output shaft of the motor 53 is positioned adjacent the offset 23 and is connected to a gear drive unit 59 that drives a right angle shaft 60. The shaft 60 extends upwards with respect to the support frame member 22 and has a pulley 62 attached. A similar pulley 64 is attached to the upper end of drive shaft 32, above the brush holder bracket 47. The two pulleys 62 and 64 are vertically aligned with each other and are connected by a drive belt 66.

Energization of the drive motor 53 rotates the drive shaft 60 and drive pulley 62. The drive belt 66 driven by pulley 62 drives pulley 64 fastened to the rotatable shaft 32. This rotates yoke 34, mounting bracket 36 and the twin search coils 40 and 41 relative to a metallic object being inspected. The search coils 40 and 41 are energized from a high frequency oscillator and associated detector circuit through cable 430, electrical brushes in brush holder bracket 47, slip rings mounted in rotatable shaft 32, and cable 43 connected to the windings of the coils 40 and 41. Similarly, variations in the electrical field produced in the object being tested are picked up by coils 40 and 41 and detected by the associated circuitry through cable 43, the associated brushes, and cable 430. During operation, the wear shoe 45 is in sliding contact with the surface of the test object as the mounting bracket 36 rotates and the entire support frame is moved in translation to scan the test object.

Where the search coils need not be mounted for rotation because the flaws are generally elongated in a predetermined direction, a simplified mounting block may be utilized, as shown in FIGURES 3 and 4 of the drawings. It should be understood, however, that the mounting arrangement shown in FIGURES 3 and 4 may be utilized with a rotating mounting bracket, as already described in connection with FIGURES 1 and 2.

As shown in FIGURE 3, two search coils 140 and 141 are supported in a rectangular shaped mounting block 70 of suitable material, such as Bakelite or nylon. The mounting block 70 is chambered, as at 72 and 73 to receive and position a pair of wire coils 140 and 141. A central opening 75 extends through the top of 76 of the mounting block 70. A single phonojack 78 is attached, as by screws 80 and 81, to the top surface 76 of the mounting block 70 directly over the central opening 75.

Each coil 140 and 141, by way of example, is formed of approximately 2800 turns of #45 insulated wire wound on a mandrel 1/8 inch long by 3/32 inch wide by 1/16 inch high and has no iron core. The coils 140 and 141 are prepared for assembly by potting the coils in a suitable potting compound to form coil assemblies 83 and 84 within chambers or bores 72 and 73, respectively. The coils 140 and 141 are connected in series opposed with their center leads connected by wire 86. An outer lead 87 from coil 141 is connected to ground via a concentric cable associated with a high frequency oscillator and detector circuit. An outer lead 89 of coil 140 is connected to the central contact 90 of phonojack 78, providing a connection to a high frequency oscillator.

Two wear shoes, such as circular sapphire bearing plates 92 and 93, are located beneath each coil at the bottom of mounting block 70 and extend downward from the lower surface of the block 70. The wear shoes are adapted to slide along the surface of the test object and space the search coils 140 and 141 a uniform, predetermined distance from the surface. In practice, a spacing of about 0.040 to 0.060 inch provides particularly good results.

As oriented in FIGURES 3 and 4, the coils 140 and 141 are essentially pancake in shape (i.e., the windings form a radial surface), circular in plan, and spaced from each other horizontally. Of course, the coils may be other than circular, if desired. The central axis of each coil is parallel to the other and is adapted to be oriented perpendicularly to a work piece being inspected. In order for both coils to simultaneously detect a single flaw of relatively short length, the coils should be closely adjacent each other, spaced apart no more than 0.5 inch at the closest adjacent portions. By way of example, coils of a diameter of 1/2 inch spaced on centers 3/4 inch apart have been found to perform satisfactorily. Such coils sense two 1/2 inch lengths of a defect extending in the direction of alignment of the two coils and spaced 1/4 inch apart.

In use, the mounting block 70 may be rotated or may be oriented so that the direction of alignment of the two coils 140 and 141 corresponds to the general direction in which the defects extend. Either the mounting block 70 or the metallic object being inspected is moved relative to the other. The block 70 rides along the surface of the object being inspected on the wear shoes 92 and 93. The particular manner in which the coils 140 and 141 function to detect flaws will be described in detail in connection with the schematic, block diagram of FIGURE 10.

A modification of the embodiment of FIGURES 3 and 4 is shown in FIGURES 5 to 8 of the drawings. This embodiment is constructed to facilitate the inspection of curved surfaces, such as cylindrical surfaces of bars or rods of steel. In this embodiment, a mounting block 96 is provided having a phonojack 98 affixed to the top. This block 96 is similar to the mounting block 70 of the embodiment of FIGURES 3 and 4, with the exception that it is fabricated to facilitate a curved test surface and utilizes coils 100 and 101 that have their terminal end surfaces contoured to conform with the curved test surface.

The bottom of the mounting block 96 is covered with a curved, protective face element 104 directly beneath the coils 100 and 101. This element may suitably be constructed of nylon and the assembly may be held together by cementing. The protective face element 104 has an outer concave surface 105 and an inner convex surface 106. The outer surface 105 is curved with a larger radius than the inner surface 106.

As indicated in dotted lines in FIGURE 6, and as shown more clearly in FIGURE 7 of the drawings, the coils 100 and 101 mounted in block 96 are curved transversely of the mounting block 96. The degree of curvature corresponds with the radius of curvature of the inner surface 106 of the curved protective face element 104. Ideally, the curvature of the terminal portion of each coil 100 and 101 would correspond exactly with the curvature of the surface being inspected to establish the most efficient electrical coupling between the coils and the articles being inspected. In practice, it is desirable to facilitate the use of such a search coil assembly with test surfaces having different radii of curvature, within an acceptable range. Thus, by way of example, it has been found that if the lower terminus of each coil is contoured to match the surface curvature of a 1½ inch diameter round bar, the coil will provide efficient electrical coupling when bars of diameters ranging from one to three inches are tested. The two different curvatures of the face element 104 aid in using such coils with test surfaces of different curvatures. Thus, for coils contoured as in the example above, the inner surface 106 of the curved protective element 104 is formed to a radius of curvature of 3/4 inch to accommodate the curvature of the terminal end of each coil 100 and 101. The outer surface 105 of the curved protective element 104 is transversely curved to a radius of 1½ inches to accommodate the curvature of the largest diameter piece to be inserted. The curvature of the outer surface 105 also provides self-aligning contact between the mounting block 96 and the generally matching cylindrical surface of the rods being inspected.

Wear shoes 109 and 110 in the form of vertical plates contoured along the bottom edge to the curvature of the outer surface of the protective face element 104, are fastened to each end of the mounting block 96, as by screws 111 and 112. These shoes are preferably constructed of carbide and provide a durable guide surface for the mounting block. Such wear shoes are particularly desirable in automated applications where considerable wear is normally experienced.

A modification of the coil configuration of FIGURES 5 and 6 is shown in FIGURE 9 of the drawings. FIGURE 9 represents a bottom plan view of a mounting block 125 constructed similarly to mounting block 70 or mounting block 96. Two elliptical coils 120 and 121 are located within the mounting block 125. The major axis of each ellipse of coils 120 and 121 extends in the direction of alignment of the two coils. The two coils are otherwise positioned in a relationship as described in connection with the embodiments of FIGURES 3 and 5. Circular wear or bearing plates 126 and 127, respectively, are associated with elliptical coils 120 and 121 and form protective face elements for the coils. These bearing plates are mounted in the lower surface of the mounting block 125 and space the elliptical coils a short, predetermined, distance from the metallic object being inspected. The lower terminal end of each coil 120 and 121, and the bearing plates 126 and 127, may be flat where flat test objects are to be inspected; alternatively, they may be transversely curved to accommodate curved test surfaces.

The embodiment of FIGURE 9 is particularly well adapted for inspecting narrow, elongated objects and, when constructed with a curved lower surface, for inspecting rods or round bars of relatively small diameter. As already explained, such rods are inspected along a spiral path by rotating the rod about the central longitudinal axis while providing relative longitudinal movement between the rod and the search coils. By forming the search coils in the form of ellipses with the major axes of the ellipses extending along the rod in alignment with the defects, an extremely wide spiral search path is obtained while maintaining efficient electrical coupling due to the narrow width of the coils and the curved lower terminus. As a result, the rate of relative movement between the search coils and the rod in the longitudinal direction of the rod may be considerably more rapid than with circular search coils of a diameter that provides similar electrical coupling.

Referring now to FIGURE 10, the electronic circuits associated with the scanning unit 20 and twin search coils are shown in block form. The electronic circuits are substantially those disclosed in U.S. Patents Nos. 2,660,704; 2,832,040; and 2,979,196, all issued to William C. Harmon, which are hereby incorporated herein by reference.

A pair of search coils, for example, coils 140 and 141 of the embodiment of FIGURES 3 and 4, are represented schematically in FIGURE 10. The search coils are shown in operative position adjacent the outer surface of a steel object being inspected.

The search coils are connected to a high frequency oscillator 200 by means of a concentric cable 430 which has an inner conductor 431 connected to the outer lead 89 of one of the two search coils wound in series opposition, and a shield conductor 432 connected with the outer lead 87 of the other search coil, and grounded. The high frequency oscillator 200 generates oscillations in the order of 10,000 cycles and has the search coil as a frequency determining element. The anode circuit of the oscillator is coupled to a cathode follower 205 which functions as an isolating circuit and has the output circuit thereof connected to the input of a high frequency feedback amplifier 210 through a feedback level control 215. The feedback level control 215 comprises a means such as a potentiometer for adjusting the amplitude of the signal voltages which are transmitted to the amplifier 210. The amplified output of the feedback amplifier 210 is coupled to a feedback rectifier 220 and a filter 225 is connected from the feedback rectifier 220 preferably to the grid circuit of the oscillator 200 to vary the grid bias of an oscillator tube. The feedback voltage serves to stabilize the amplitude of oscillation at a relatively constant level. The filter 225 serves as a time delay or integrating device so that changes in amplitude of the signals at the output of the oscillator which are returned to the oscillator through the filter 225 are delayed slightly and do not immediately produce compensating changes in grid bias which would oppose the original changes. Consequently, as the detector coils and the metallic object being inspected are moved relative to each other, cracks, seams and similar imperfections in the metallic object will produce changes in the amplitude of the high frequency signals which appear at the output of the cathode follower 205. Other variables in the product which it is not desired to detect produce slower changes in the level of oscillation. These changes are slow enough to be cancelled by the feedback circuit and are not detected.

The signals from the cathode follower 205 are also transmitted through a high frequency signal level control 230, and two high frequency amplifiers 235 and 240 to a demodulator 245 which rectifies the high frequency signals and transmits the changes in the signals which are produced by the flaws or imperfections as relatively low frequency signals. These changes are denoted as low frequency signals by way of distinction from the signals which are generated by the oscillator 200. The mode of operation of these circuits is described in more detail in the patents referred to above.

The low frequency signals at the output of the demodulator 245 are transmitted to a clamper 250, a two-stage low frequency amplifier 255 and a second clamper 260. A cathode follower 265 connected to the output of the clamper 260 provides a low impedance output for transmitting the amplified signals to a remote level control 270. The low impedance circuit minimizes any extraneous pick-up due to the high frequency fields usually prevalent in the locations in which the apparatus is used.

The remote level control may consist of a potentiometer or the like and is utilized to provide remote adjustment of the signal amplitude. The output of the remote level control 270 is connected to control circuits, indicated generally at 275, that control a suitable indicator or actuator, such as a meter or light, in the manner shown in U.S. Patent No. 2,979,196.

In operation, twin search coils constructed as described above are positioned adjacent a metallic object to be inspected. The coils are spaced a distance of between 0.040 and 0.060 inch from the surface being inspected by wear shoes adapted to slide along the surface of the test object. In the case of the rotating scanning head of FIGURES 1 and 2, the head is rotated about a central axis midway between the two search coils, and the entire unit is moved in translation relative to the work piece. In such instance, the speed at which the search coils are rotated is rapid relative to the speed of translation of the search unit relative to the work piece. In practice, the speed at which the coils are rotated relative to the work piece should be at least five times the translational speed of scanning, and preferably should be about 10 times as fast.

The action of the oscillator circuit 200 is based upon known principles of feed back between plate and grid circuits, which require no explanation. The twin search coils are supplied by the oscillator and induce eddy currents in the object being inspected. Defects increase the length of the eddy current path and thus decrease the load of the search coils and therefore the load of the oscillator. The amplitude of oscillation of the oscillator is thus increased when defects are encountered, and the deeper the seam the greater the unloading effect and consequent increase in oscillation amplitude. The defects cause rapid changes in the loading of the oscillator as the search coils pass over them. Other less rapid variations due to surface conditions and curvatures of the surface, for example, are compensated through the feed back circuit which stabilizes and controls the operation of the oscillator so that the effect of slow variations in the coupling of the search coil are cancelled.

The search coils of the scanning unit, being spaced from each other, induce eddy currents and detect variations in coupling at two spaced locations along a defect. Because almost all natural defects vary considerably in depth, even for short distances along their length, the spacing of the two detector coils gives an indication that is a function of the depth of the flaw adjacent each coil. This indication is therefore more consistent with the average depth of the defect than would be obtained by a reading from a single coil of the same diameter.

While in the foregoing disclosure certain preferred embodiments of the invention have been disclosed, it will be understood numerous modifications and alterations may be made therein without departing from the spirit and scope of the invention as set forth in the appended claims.

What is claimed is:

1. A device for inspecting metallic objects comprising in combination: two search coils each comprised of a similar number of turns of a continuous insulated strand with the turns of each coil having a common axis and lying closely adjacent each other to form a generally planar coil, said coils being essentially coplanar, connected in series opposition and spaced apart no more than 0.5 inch at the closest adjacent portions; means, including a high frequency oscillator, for simultaneously energizing both coils to generate eddy currents in said object and form an eddy current circuit that includes the coils and object when said coils are moved closely adjacent a surface of said object with the plane of said windings substantially parallel to said surface, said oscillator being connected in series to said coils with the windings of said coils constituting an impedance load for said oscillator, the output of said oscillator increasing in response to a change in impedance of said coils caused by the presence of a flaw in said metallic object; a stabilizing feed-back circuit to control operation of the oscillator to minimize response to slow changes in the output of the oscillator, such as might be caused by surface curvature of the object; circuit means electrically connected with said energizing means for indicating a change in the output of the oscillator in response to the presence of a flaw in said metallic object; and means mounting the two search coils within a single scanning head.

2. A device as set forth in claim 1 wherein each coil includes a cylindrical surface extending transversely of the central axis of the coils.

3. A device as set forth in claim 1 wherein the two search coils are each located in a separate one of two side-by-side chambers of a mounting block, which chambers open through a common surface of the block, said coils being positioned with the axis of each coil perpendicular to the said common surface, an electrical connection adjacent another surface of the block for electrically connecting an outer lead of each of the two coils to a concentric cable, a protective face element covering the wire coils and extending across the chambers of the block, and a wear element adjacent the said one surface of the block adapted to slide along a metallic object being inspected to maintain a predetermined spacing between the coils and the object.

4. A device as set forth in claim 3 including means to rotate the mounting block about an axis between and parallel to the axes of the two coils.

5. In a device for inspecting metallic objects, a mounting block, two side-by-side chambers within the block opening through one surface thereof, a pair of coreless wire coils each comprised of a continuous strand formed with windings lying closely adjacent to each other and on a common axis in a generally coplanar disposition, said pair of coils being coplanar with each other, being elongated in the plane of the windings in a direction that intersects the axes of both coils, having a similar number of windings and connected together in series opposition, one coil located in each of the two chambers with the axes of each coil parallel to the other and essentially perpendicular to the said one surface of the block, an electrical connection adjacent another surface of the block for electrically connecting an outer lead of each of the two coils to a concentric cable, a protective face element covering the wire coils and extending across the chambers of the block, and a wear element adjacent the said one surface of the block adapted to slide along a metallic object being inspected to maintain a predetermined spacing between the coils and the object.

6. In a method of inspecting metal objects, the steps of moving two search coils, each comprised of a continuous strand formed with windings having a common axis and that lie closely adjacent each other to form a generally planar coil, together as a unit in close and coplanar relationship adjacent a surface of a metallic object with the coils substantially uniformly spaced from the surface, directly energizing both coils with an oscillating electrical current from an oscillator to generate eddy currents in said object, positioning both coils concurrently over different portions of a single flaw such as a seam in the surface of the object to vary the impedance of both search coils concurrently varying the amplitude of the oscillations of said oscillator energizing the coils in response to a change in the impedance of the search coils, and detecting the change in the amplitude as an indication of the presence of a flaw adjacent the coils.

7. The method as set forth in claim 6 including the step of rotating the two coils about an axis generally perpendicular to the said surface of the object and moving the said axis relative to the surface while maintaining the coils a substantially constant distance from the surface.

8. The method as set forth in claim 6 including the steps of relatively moving the search coils and object in translation and rotating the two search coils about an axis parallel to the axis of the coils at a higher speed relative to the object than the speed of relative translational movement between the axis of rotation of the coils and the object.

References Cited

UNITED STATES PATENTS

| | | | |
|---|---|---|---|
| 2,998,566 | 8/1961 | Cochran | 324—37 |
| 2,401,332 | 9/1968 | McClurg et al. | 324—40 |

RUDOLPH V. ROLINEC, Primary Examiner

R. J. CORCORAN, Assistant Examiner

PO-1050
(5/69)

UNITED STATES PATENT OFFICE
CERTIFICATE OF CORRECTION

Patent No. 3,497,799      Dated February 24, 1970

Inventor(s) William C. Harmon

It is certified that error appears in the above-identified patent and that said Letters Patent are hereby corrected as shown below:

Column 4, line 47, "load" should be -- lead --.

The following References Cited should be included under United States Patents:

| | | | |
|---|---|---|---|
| 1,801,328 | 4-1931 | Burrows | 324-37 |
| 2,689,940 | 9-1954 | Barnes et al | 324-37 |
| 2,832,040 | 4-1958 | Harmon | 324-34 |
| 2,894,203 | 7-1959 | Cory | 324-40 |
| 3,247,453 | 4-1966 | Quittner | 324-37 |
| 3,271,664 | 9-1966 | Mountz et al | 324-40 |
| 3,281,667 | 10-1966 | Dobbins et al | 324-40 |

Under References Cited, delete "2,401,332" and substitute -- 3,401,332 --.

SIGNED AND SEALED

JUL 28 1970

(SEAL)
Attest:

Edward M. Fletcher, Jr.
Attesting Officer

WILLIAM E. SCHUYLER, JR.
Commissioner of Patents